UNITED STATES PATENT OFFICE.

JULIUS LEEDE, OF MINNEAPOLIS, MINNESOTA.

PROCESS OF TREATING REFRACTORY ORES.

SPECIFICATION forming part of Letters Patent No. 471,616, dated March 29, 1892.

Application filed May 10, 1890. Serial No. 351,299. (No specimens.)

*To all whom it may concern:*

Be it known that I, JULIUS LEEDE, a citizen of the United States, residing at Minneapolis, in the county of Hennepin and State of Minnesota, have invented certain new and useful Improvements in Processes of Treating Refractory Ores; and I do hereby declare that the following is a full, clear, and exact description of the invention, such as will enable others skilled in the art to which it appertains to make and use the same.

My invention relates to an improved process of treating refractory ores containing gold, silver, &c.

The object of my invention is to eliminate from tellurides, sulphurets, arseniates, antimoniates, phosphurets of iron, lead, copper, &c., containing the precious metals, known generally as "refractory ores," the base metals and metalloids and to oxidize the oxidizable metals, so as to secure by subsequent treatment a maximum of the precious metals conveniently and economically. It is known that in the presence of tellurium, in connection with other base metals, gold and silver volatilize at relatively low temperatures, and this is especially the case when salt or other chloridizing agent is present or artificially mixed with the ore and the same is subjected to a roasting heat. It is also known that roasting is the usual and approved way of eliminating these base metals to prepare the ore for subsequent treatment, such as smelting, amalgamating, chloridizing, &c. In practice, however, a large per cent. of the precious metals is volatilized and carried off in the fumes in the roasting and desulphurizing processes as heretofore practiced. Moreover, in roasting according to ordinary methods the surface of the ore is first acted on, and then a coating is formed which prevents the further entrance to the body of ore of oxygen from the air and the escape of sulphur or other compounds from the body, and as a sequence a large per cent. of the gold is lost by reason of the failure to remove or oxidize all of the volatile or oxidizable metals.

My method or process is an attempt to artificially imitate natural processes of oxidation, as exemplified in surface ores and which takes place in the dumps or tailings from the workings of old mines. According to my improved method the ore, by preference broken to about the size of stove-coal, is heated to a moderate degree by subjecting it to the influence of an oxidizing-flame in direct contact with the ore, which flame has a capacity of raising it to a much higher degree of heat, and intermittently subjecting the ore to the sudden chilling effect of water or aqueous vapor in direct contact with said ore for a period of about thirty minutes, more or less, according to the character of the ore and the heating capacity of the flame. The amount of water and of chill and the length of the intermission between chills are regulated so that the temperature is not permitted to become great enough to volatilize the precious metals. Obviously the same result would be obtained with a relatively slow or small flame by taking longer time. The essential characteristic of this step or process is that the ore be brought to just such degree of heat as will with the character of flame used eliminate the more volatile of the base part of the ore without carrying off any of the precious metals and that the successive chills for disintegrating the surface of the ore shall be a part of a continuous process. After the greater part of the tellurium has been expelled (readily determined by test or observation) the ore is then subjected for another period to the influence of an oxidizing-flame in direct contact with said ore at a higher degree of heat, with intermittent chillings for the further elimination and oxidation of the volatile or oxidizable metals. According to this practice ore is subjected to the continuous heating and other influences of an oxidizing-flame in direct contact with it and to the intermittent disintegrating and other influences of water or aqueous vapor in a continuous process.

In practice I place the ore in a furnace-chamber and subject the same to the continuous direct influence of an oxidizing-flame from a gas-burner, intermittently subject the heated ores while in the furnace to the influence and chill due to the introduction of water for a short period, and then agitate and mix the ores to present new surfaces to the action of the flame and water by dumping the ore from one receptacle to another, and then continue the treatment at the same or somewhat higher temperature for another period, and so on for three or more periods, and finally this part of the process is concluded by giving the ore what is called a "sweet-roast"—to wit, a final treatment to the contact influence of an oxidizing-flame at a high temperature. This treatment is followed by subjecting the previously-treated ore to the further combined influence of the contact oxidizing-flame and brine or other chloridizing agents, all being a single continuous process. By following this treatment or process I have been enabled to prevent the escape of the valuable metals with the fumes and have prevented the formation of a skin or envelope over the ore particles by reason of the contact of oxygen with the surface of the highly-heated ore, as is frequently the case, and have been enabled to secure from ninety-four to ninety-eight per cent. of the precious metals, as compared with fire-test assays.

Having now described my invention, what I claim is—

1. The continuous process of treating refractory auriferous and argentiferous ores, which consists in subjecting the ore to the continuous action of an oxidizing blow-pipe flame in direct contact with the ore at a moderate degree of heat and intermittently subjecting the heated ore to the action of water, whereby the volatile elements or compounds are driven off, the oxidizable elements or compounds are oxidized, and the precious metals are left substantially free and in suitable condition for amalgamation of chlorination, substantially as described.

2. The continuous process of treating refractory auriferous and argentiferous ores, which consists in subjecting the ore to the continuous action of an oxidizing blow-pipe flame in direct contact with the ore at a moderate heat, intermittently subjecting the heated ore to the action of water, agitating the ore, and then repeating the operation at a higher heat, and finally subjecting it to an oxidizing-roast without chills, whereby the volatile elements or compounds are driven off, the oxidizable elements or compounds are oxidized, and the precious metals are left free and in suitable condition for amalgamation or chlorination, substantially as described.

3. The continuous process of treating refractory auriferous and argentiferous ores, which consists in subjecting the ore to the continuous action of an oxidizing blow-pipe flame in direct contact with the ore at a moderate heat, intermittently subjecting the heated ore to the action of water for a period of time, then to a sweet or oxidizing roast without chills, and finally subjecting it to the action of a chloridizing agent, substantially as described.

In testimony whereof I affix my signature in the presence of two witnesses.

JULIUS LEEDE.

Witnesses:
EDWIN L. BRADFORD,
H. H. BERGMANN.